United States Patent
Chafni et al.

(10) Patent No.: US 11,749,043 B2
(45) Date of Patent: Sep. 5, 2023

(54) PASSIVE MULTI-FACTOR ACCESS CONTROL WITH BIOMETRIC AND WIRELESS CAPABILITY

(71) Applicant: 214 Technologies Inc., Venice, CA (US)

(72) Inventors: Nezare Chafni, Santa Monica, CA (US); Shaun Moore, Siesta Key, FL (US)

(73) Assignee: 214 Technologies Inc., Venice, CA (US)

( * ) Notice: Subject to any disclaimer, the term of this patent is extended or adjusted under 35 U.S.C. 154(b) by 13 days.

(21) Appl. No.: 17/319,793

(22) Filed: May 13, 2021

(65) Prior Publication Data

US 2021/0358244 A1 Nov. 18, 2021

Related U.S. Application Data (60) Provisional application No. 63/024,438, filed on May 13, 2020.

(51) Int. Cl.
| | |
|---|---|
| *G07C 9/25* | (2020.01) |
| *G06F 21/60* | (2013.01) |
| *G06N 20/00* | (2019.01) |
| *G07C 9/10* | (2020.01) |
| *G06F 21/32* | (2013.01) |

(52) U.S. Cl.
CPC ............ *G07C 9/257* (2020.01); *G06F 21/32* (2013.01); *G06F 21/602* (2013.01); *G06N 20/00* (2019.01); *G07C 9/10* (2020.01)

(58) Field of Classification Search
CPC ......... G07C 9/257; G07C 9/10; G06F 21/602; G06F 21/35; G06F 21/32; G06N 20/00; G06N 3/08
See application file for complete search history.

(56) References Cited

U.S. PATENT DOCUMENTS

| | | | |
|---|---|---|---|
| 10,127,754 B2* | 11/2018 | Child | G07C 9/00563 |
| 10,305,895 B2* | 5/2019 | Barry | G06V 40/172 |
| 10,657,782 B2* | 5/2020 | Bradley | G07C 9/00563 |
| 10,685,520 B2* | 6/2020 | Van De Walle De Ghelcke | G06F 21/34 |
| 2002/0094111 A1* | 7/2002 | Puchek | G07C 9/257 382/115 |
| 2004/0036574 A1* | 2/2004 | Bostrom | G07C 9/37 340/5.82 |
| 2013/0307670 A1* | 11/2013 | Ramaci | G07C 9/257 340/5.82 |
| 2014/0188770 A1* | 7/2014 | Agrafioti | A61B 5/7267 706/13 |
| 2015/0015365 A1* | 1/2015 | Ortiz | G07C 9/25 340/5.52 |

(Continued)

OTHER PUBLICATIONS

International Search Report and Written Opinion dated Aug. 17, 2021 for PCT/US2021/032270.

*Primary Examiner* — Brian E Miller
(74) *Attorney, Agent, or Firm* — Reed Smith LLP; Nina Habib Borders (57) ABSTRACT

Described are systems and methods for providing an authorized user access to a restricted area using a combination of biometric identification factors, such as facial feature recognition, and wireless detection of a device associated with the authorized user.

20 Claims, 3 Drawing Sheets

(56) References Cited

U.S. PATENT DOCUMENTS

| | | | |
|---|---|---|---|
| 2015/0221151 A1* | 8/2015 | Bacco | H04W 12/64 |
| | | | 340/5.83 |
| 2015/0309487 A1* | 10/2015 | Lyman | G05B 15/02 |
| | | | 700/275 |
| 2016/0217638 A1* | 7/2016 | Child | H04L 12/2827 |
| 2016/0308859 A1 | 10/2016 | Barry et al. | |
| 2017/0213088 A1* | 7/2017 | Child | H04N 7/181 |
| 2017/0264608 A1* | 9/2017 | Moore | G07C 9/257 |
| 2018/0047230 A1* | 2/2018 | Nye | G07C 9/37 |
| 2019/0044951 A1* | 2/2019 | Zivkovic | H04L 67/535 |
| 2019/0147676 A1* | 5/2019 | Madzhunkov | H04N 5/33 |
| | | | 340/5.2 |
| 2019/0220583 A1 | 7/2019 | Douglas et al. | |
| 2019/0281049 A1* | 9/2019 | Scheller | H04L 63/102 |
| 2020/0126338 A1* | 4/2020 | Friedli | G07C 9/253 |
| 2020/0286317 A1* | 9/2020 | Xu | G06Q 20/3278 |
| 2021/0287469 A1* | 9/2021 | Ryhorchuk | G06V 40/172 |
| 2021/0358244 A1* | 11/2021 | Chafni | G07C 9/10 |
| 2021/0382970 A1* | 12/2021 | Odinokikh | G06N 3/0454 |
| 2022/0004612 A1* | 1/2022 | Moriwaki | G06V 40/172 |

\* cited by examiner

PASSIVE MULTI-FACTOR ACCESS CONTROL WITH BIOMETRIC AND WIRELESS CAPABILITY

CROSS-REFERENCE TO RELATED APPLICATION

This application claims priority to U.S. Provisional Application Ser. No. 63/024,438, filed on May 13, 2020 and entitled "Passive Multi-Factor Access Control with Biometric and Wireless Capability", to the extent allowed by law, and which is incorporated herein by reference.

TECHNICAL FIELD

This disclosure relates to a system and method for providing access control to a restricted area using a combination of biometric identification factors and wireless communication.

BACKGROUND

Passive technology interaction in which the user does not interact directly with technology is the ultimate goal of many engineers and designers in several disciplines. The best user interface is no apparent interface at all and in the security industry, the goal of seamless access control has been a driving force behind many innovations.

SUMMARY OF THE DISCLOSED SUBJECT MATTER

This disclosure provides a system for providing access control using multi-factor identification and authentication of users in motion, comprising wireless communication with a device associated with a user, and biometric recognition of the user without requiring the user to scan an identification device or interact directly with the access control system.

Such a system also offers enhanced security by preventing the use of stolen credentials. This type of system will provide the extremely high accuracy of card access systems while affording the convenience of seamless access created by the facial recognition system. Such a system will be more secure and reliable than could be accomplished by facial recognition systems alone.

This disclosure provides a system for controlling access of a user to an area, the system comprising an operable barrier to entry to the area; a closure device configured to operate the barrier to prevent or allow entry of the user to the area; a detector configured to wirelessly detect a device associated with an authorized user; a biometric capture device configured to capture a biometric characteristic of the user; a memory; a processor configured to receive data associated with the detection of a device associated with the authorized user from the detector and the biometric characteristic of the user from the biometric capture device; determine the proximity of the device associated with the authorized user to the detector and the time of detection of the device associated with the authorized user; compare the captured biometric characteristic to a characteristic of the authorized user stored in the memory; determine that the captured biometric characteristic matches that of the authorized user; determine that the proximity of the device associated with the authorized user to the detector and biometric characteristic of the authorized user indicate the presence of the authorized user at the operable barrier; and instruct the closure device to operate the barrier to allow the authorized user to access the area.

Embodiments of the system include the following, alone or in any combination.

The system wherein the biometric characteristic of the user comprises facial features of the user.

The system wherein the biometric characteristic of the user comprises a data string transformed by a facial feature mapping template and algorithm from an image of the user.

The system wherein the captured biometric characteristic is compared to a data string transformed by a facial feature mapping template and algorithm from an image of the authorized user stored in the memory.

The system wherein the data string transformed by the facial feature mapping template and algorithm from the image of the authorized user is encoded, encrypted and stored on the device associated with the authorized user.

The system wherein the data associated with the detection of a device associated with the authorized user comprises the encoded, encrypted data string.

The system wherein the data associated with the detection of a device associated with the authorized user comprises a security code assigned to the authorized user.

The system wherein the processor is further configured to determine that the presence of the authorized user at the operable barrier is at a time at which the authorized user is permitted to access the area.

The system further comprising machine learning algorithms to improve efficacy of the determination that the captured biometric characteristic matches that of the authorized user.

The system wherein the processor is further configured to determine that adverse conditions prevent accurate capture of the biometric characteristic of the user and provide output to instruct the access control point to notify the user that the biometric characteristic was not captured.

Also provided is a method for controlling access of a user to an area, the method comprising detecting a device associated with an authorized user; capturing a biometric characteristic of the user; determining the proximity of the device associated with the authorized user to the detector and the time of detection of the device associated with the authorized user; comparing the captured biometric characteristic to a characteristic of the authorized user stored in the memory; determining that the captured biometric characteristic matches that of the authorized user; determining that the proximity of the device associated with the authorized user to the detector and the biometric characteristic of the authorized user indicate the presence of the authorized user at the operable barrier; and instructing a closure device to operate a barrier to allow the authorized user to access the area.

Embodiments of the method include the following, alone or in any combination.

The method wherein the biometric characteristic of the user comprises facial features of the user.

The method wherein the biometric characteristic of the user comprises a data string transformed by a facial feature mapping template and algorithm from an image of the user.

The method wherein the data associated with the detection of a device associated with the authorized user comprises a security code assigned to the authorized user.

The method further comprising the processor determining that the presence of the authorized user at the operable barrier is at a time at which the authorized user is permitted to access the area.

Also provided is a non-transitory computer readable medium having computer readable instructions stored thereon, that when executed by a computer cause at least one processor to receive data associated with the detection of a device associated with the authorized user from the detector and the biometric characteristic of the user from the biometric capture device; determine the proximity of the device associated with the authorized user to the detector and the time of detection of the device associated with the authorized user; compare the captured biometric characteristic to a characteristic of the authorized user stored in the memory; determine that the captured biometric characteristic matches that of the authorized user; determine that the proximity of the device associated with the authorized user to the detector and the biometric characteristic of the authorized user indicate the presence of the authorized user at the operable barrier; and instruct the closure device to operate the barrier to allow the authorized user to access the area.

Embodiments of the non-transitory computer readable medium include the following, alone or in any combination.

The non-transitory computer readable medium wherein the biometric characteristic of the user comprises facial features of the user.

The non-transitory computer readable medium wherein the biometric characteristic of the user comprises a data string transformed by a facial feature mapping template and algorithm from an image of the user.

The non-transitory computer readable medium wherein the data associated with the detection of a device associated with the authorized user comprises a security code assigned to the authorized user.

The non-transitory computer readable medium further comprising instructions to cause the processor to determine that the presence of the authorized user at the operable barrier is at a time at which the authorized user is permitted to access the area.

Embodiments include any of the embodiments described above or anywhere in the Specification and Figures, alone or in any combination.

DETAILED DESCRIPTION

This disclosure provides a system for providing access control using multi-factor identification and authentication of authorized users using detection of a device associated with an authorized user and recognition of one or more biometric characteristics of the authorized user to allow the authorized user to access a restricted area.

As used herein, a "user" of the system is a human who enters the vicinity of a controlled access area. As used herein an "authorized user" is a user who is enrolled in the system and is permitted to enter the controlled access area. Enrollment of a user comprises the user obtaining permission to enter the area from the owner, government entity, security administrator or any delegate thereof enabled to grant permission for access to the controlled access area, associating a security code or app with a device to be kept in the possession of the authorized user, and providing biometric characteristics of the authorized user. The enrollment may be carried out by a user, the owner, government entity, administrator or delegate, or any combination thereof. Enrollment is complete when all three elements are registered in the system. An administrator can enroll users, grant permanent, period, or temporary space access, and add sub-managers (delegates) to the system.

In some embodiments, for enrollment, the biometric characteristics may be captured on a device remote from the system and transmitted to the system. In a specific embodiment, the biometric characteristic may be facial features of the user. Facial recognition can recognize faces generally and, with sufficient feature mapping of an image of an individual user, can be used to identify the individual with high degrees of confidence. For example, a user during the enrollment process may provide a photographic image to the system for processing and storage, or an image can be captured during an enrollment process at the facility using the system, using a biometric capture device as described herein.

The system is described primarily herein for embodiments wherein the authorized user is a person. However, an authorized user may be an animal such as a pet (e.g. dog, cat, etc.) or livestock (e.g. cattle, pigs, fowl, etc.) For animals, a device associated with the user may comprise an ear tag, implantable chip or bolus that is configured to wirelessly communicate with the system.

As described further below, in some embodiments, an "authorized user" may be an inanimate object that can be security tagged for tracking through a facility. In some embodiments, "authorized user" may further comprise a personal vehicle such as an automobile associated with an authorized human user that can be recognized by the system.

The feature mapping used in the system is sufficiently robust that facial recognition of authorized users can be achieved even under non-optimal conditions, such as glare, bad lighting or other environmental conditions, poor body pose, or feature blocking by, for example, eyewear, masks or other PPE. However, as discussed further herein, the system can adjust lighting, request a user to repose, remove a mask, etc. to enable facial authentication if the biometric characteristics captured at an access control point cannot verify a match.

The system uses facial feature mapping templates and algorithms to transform an image of an individual to a data string, which may be optionally be represented by alphanumeric text. The data string can be stored in memory of the system to be associated with the enrolled (authorized) user. The data text string may be further encrypted, such as by asymmetric encryption to transform it to a security code that does not convey facial recognition information to human or electronic systems not associated with the instant system.

The security code may comprise the entire encrypted data string, a portion thereof, or a separate code not containing any facial information assigned to the authorized user that can be accessed from memory in the system to link the security code to the authorized user and retrieve the data string associated with the authorized user for comparison to biometric characteristics of a user captured by a device at an access control point associated with the system.

The security code is assigned to the authorized user and can be loaded onto a device described herein that will be recognized by the system by one or more device detectors as described herein. Once the security code is loaded onto the device, the device is linked uniquely to the authorized user and cannot be used to access secured areas by individuals other than the assigned user, as described herein. In some embodiments, the security code may be transformed to a visual representation such as a 2D barcode, QR code or any other graphic representation that can be read by a device equipped with a camera to load the security code to the device. An app may also be loaded to the device to enable it to interact with the system, optionally using the same 2D barcode, QR code or other graphic representation. The encrypted security code may be decrypted by the device with an assigned decryption key.

In some embodiments, the size of the face template can be reduced using dimensionality reduction techniques, and then converted into encrypted text, NDEF records, or binary data that can be stored on RFID keyfobs, access cards, NFC tags. A user can communicate a new template to the system in this case by scanning his tag, fob, card, or NFC compatible device. A processor associated with the system can utilize an asymmetric encryption process to verify the authenticity of the template by decrypting it with its private key.

In some embodiments, the user-associated device stores the encrypted biometric characteristic of the authorized user, such as the user's facial template, and the system does not store users' biometric characteristic in a central database. In these embodiments, the user-associated device permits the system to read the biometric characteristic stored thereon to compare to a biometric characteristic detected in real time from a user at an access control point.

These embodiments can enable a user-initiated facial recognition system that holds no data (no face templates), but it simply matches the templates it decrypts to the face presented in front of it. This creates a facial recognition system that only identifies an individual when the individual wants it to.

Advantages of these embodiments can include: 1) simplifying enrollment; 2) decentralizing enrollment (allowing users to take photos on their device then communicating to the reader by putting it on the reader); 3) updating the device with new enrollment if one fails; and 4) creating a privacy-conscious face recognition system that holds no data and only identifies an individual when the individual would like it to.

In some embodiments, the device may hold a plurality of security codes associated with the user to enable the user to be an authorized user for a plurality of access control points, each using a different security code. The plurality of access control sites may be associated with a single client or a plurality of clients operating the system.

In some embodiments the system may require the device to also provide a second code appended to the primary security code, which may be a one-time or periodic code based on verification flows that can be used as a second factor of authentication of the device with the system. The second code may be associated with, for example, an authorized time or location of entry for an authorized user. In some embodiments, the second code may be a "clock" code that can be matched with a clock code running in the system. The clock code at the device may have an expiration time assigned by the system when it detects the device, or it may have an expiration time associated with an expected time of travel to an access control point or an expiration time linked to permitted time(s) of access associated with the authorized user.

Passage through an access control point associated with the system requires a three-way match among the security code assigned to the device, biometric characteristics captured from a user at the access control point and a biometric characteristic stored in the system or in the user-associated device. As described herein, access to authorized users may further be limited to times or locations permitted to the authorized user, thereby requiring a four-, five- or more match for a user to gain access to an area.

Figure 1:
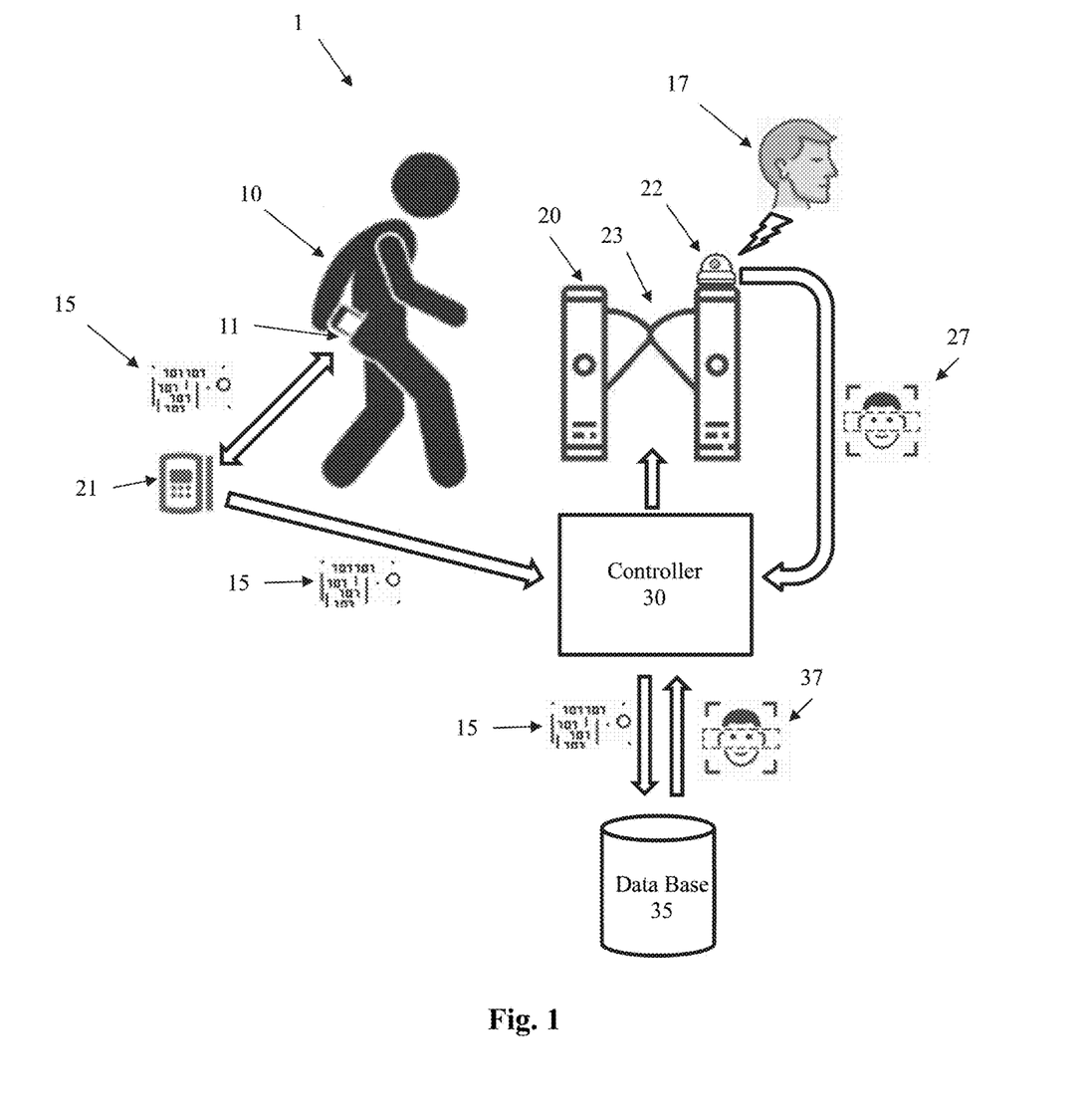
FIG. 1 shows aspects of a system for authorizing a user to access an area according to exemplary embodiments of the disclosed subject matter.

FIG. 1 shows aspects of a system 1 for authorizing a user to access an area according to the disclosed subject matter. A person, such as an authorized user 10, carrying a device 11 associated with the user 10 by the system, approaches an access control point 20. In the embodiment shown, the device may be a mobile phone, but this is not limiting. An autonomous reader 21, such as a bluetooth-enabled reader, detects the device 11 and obtains credentials of the user 10 stored on the device 11. As discussed herein, the credentials comprise a security code 15 associated with an authorized user in the system. In embodiments, the reader 21 has sufficient range to allow detection of the authorized device 11 prior to the user 10 arriving at the access control point 20 to minimize the time an authorized user is held at the access control point before admittance is allowed. The reader 21, having detected a device 11 associated with the user 10 and received a security code 15 from it, transmits the security code 15 to a controller 30, which retrieves a facial recognition template 37 previously obtained from a facial scan of the authorized user 10 associated with the security code 15 from a database 35. In some embodiments, the security code 15 includes a data string encoding the facial recognition template 37 previously obtained from a facial scan of the authorized user 10 and the controller 30 decodes the security code 15 to extract the facial recognition template 37 therefrom. In these embodiments, the system does not store facial recognition templates of authorized users in a database 35. Further, the controller may retrieve access control rules for the authorized user 10 or other information from database 35 to determine whether the authorized user 10 is allowed to pass through the access control point 20 at the time the user approaches the access control site 20. When the person (e.g. the authorized user 10) is close to the access control point 20, a facial feature detector 22 detects the person's face 17 and converts the detected face to a facial template 27 using algorithms in the system. The facial recognition system in the controller 30 determines whether the detected facial template 27 matches the facial template 37 of the authorized user 10 associated with the security code 15 obtained from the device 11. The system further confirms that the security code obtained from the device was detected within a defined time range prior to the detection of the user's face at the access control point. If both the security code 15 obtained by the device detector 21 and the facial recognition template 27 obtained by the facial recognition reader 22 match those of an authorized user 10, and are detected in proximity to the access control point, the system will determine that an authorized user 10 is present. The controller will send instructions to the access control point 20 to open the barrier 23 and allow the authorized user 10 access to a controlled area beyond the barrier.

Figure 2:
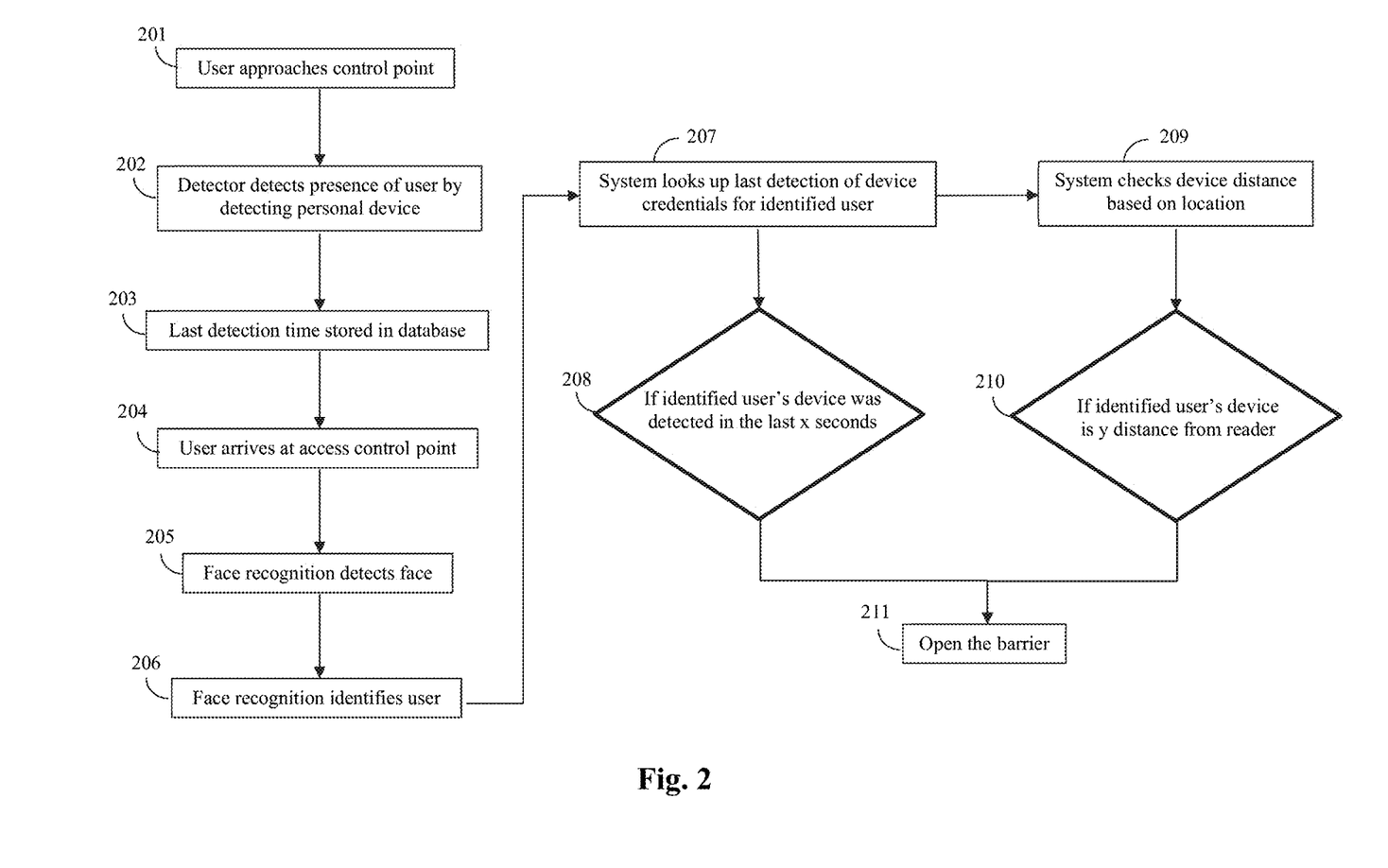
FIG. 2 shows a process flow diagram of a user authorization process according to exemplary embodiments of the disclosed subject matter.

FIG. 2 shows a process flow diagram of a user authorization process according to exemplary embodiments of the disclosed subject matter. As shown in FIG. 2, a user approaches an access control point to an area that requires access control. If the user is an authorized user, a device, described in more detail below, carried by the authorized user is detected by wireless communication by the access control system. The time of detection is stored in a database of the system. Next, the user arrives at the access control point comprising an operable barrier and a biometric capture device captures a biometric characteristic of the user. A processor compares the captured biometric characteristic to biometric characteristics of authorized users in a database of the system or the user-associated device.

The process starts when an enrolled or authorized user approaches the access control point (step 201). The reader detects the user's personal device (e.g. phone, smartwatch, Bluetooth tag) (step 202), and communicates the detected credentials, e.g. a unique identifier for the device that is in turn used to identify the user associated with the device, to the system's computer. Other information that can be used to confirm identification can include location and signal strength. The processor handles the detection and stores it in a database along with the timestamp of the detection (step 203). Detection of an authorized user's device may also signal the processor to retrieve the user's biometric characteristic, and/or other data such as conditional access rules, from the database for comparison to the facial features detected at step 204.

The user arrives at the access control point (step 204), triggering the face recognition system running face detection (step 205). In some embodiments, the system may be continuously running and scanning for faces at the access control point and the identification process of face recognition is triggered by the presence of a face. In other embodiments, to optimize power consumption, processing efficiency or other factors, the system can also be made to wake up only if a credential is detected in step 202. That is, face detection, followed by recognition, only happens if a credential (authorized user's device) is detected.

Biometric characteristic of the user are compared to stored biometric data of authorized users (step 206). For example facial recognition identifies the face as that of an authorized user. The system accesses a database of stored biometric characteristics based on biometric templates for authorized users, which may include stored images of facial features or tabulated data based on the facial features, or any other biometric characteristic and compares the stored data to the acquired data to confirm a match at a specified confidence interval. The system stores users' biometric templates extracted from images to use in identifying the user. Preferably, these biometric templates are encrypted and cannot be used by another system. Alternatively, the system reads the biometric characteristic code stored on the user-associated device for comparison to the user's biometric characteristic captured at the access control point to determine whether the user is an authorized user. In these embodiments, the biometric characteristic code is not stored in a central database.

Machine learning algorithms in the system may use multiple biometric captures to adjust weighting factors to improve recognition efficacy.

Figure 3:
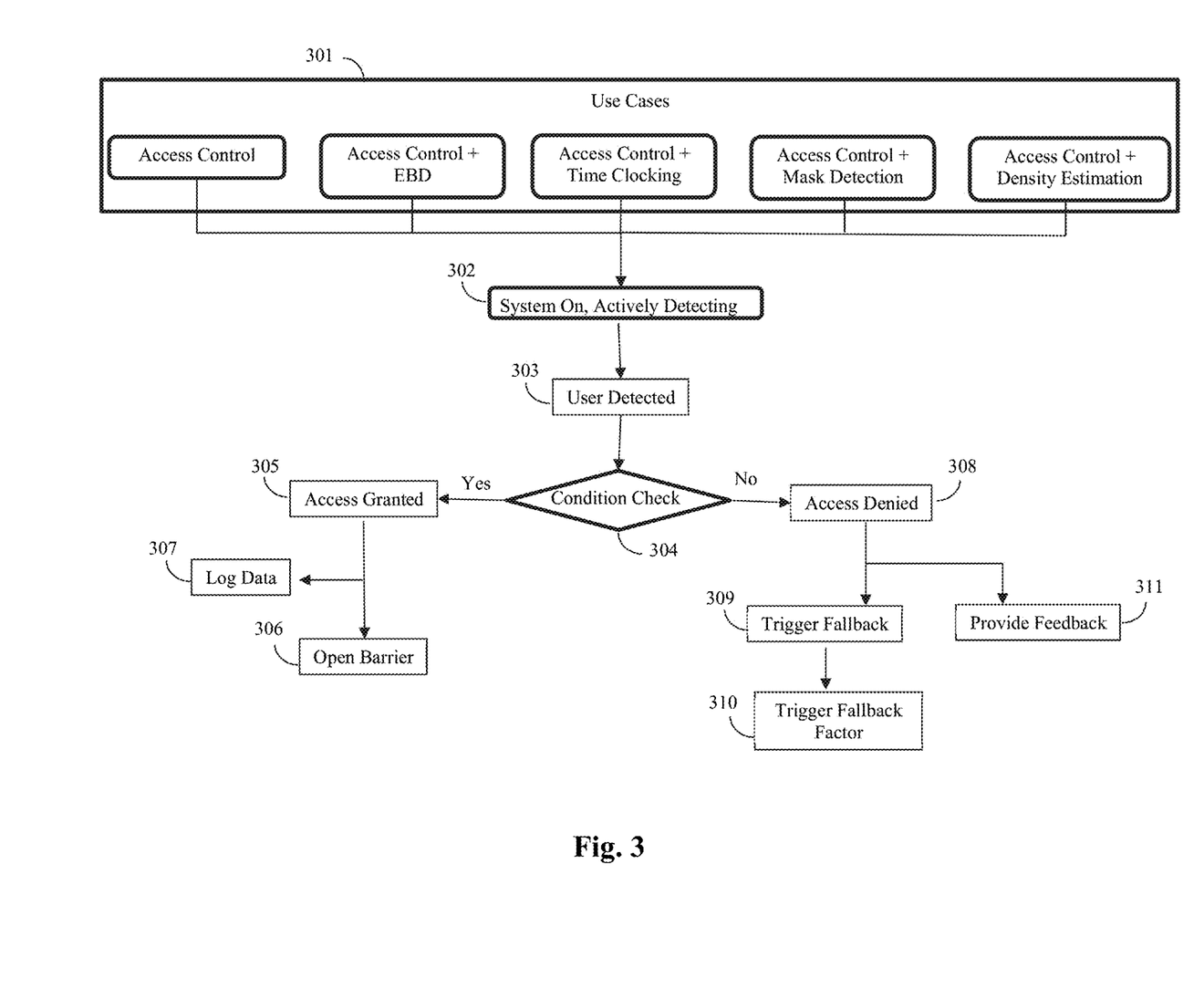
FIG. 3 shows aspects of a decision tree for a processor to authorize a user to access an area according to exemplary embodiments of the disclosed subject matter.

FIG. 3 shows aspects of a decision tree for a processor to authorize a user to access an area according to exemplary embodiments of the disclosed subject matter. The system can be used in a number of use cases as shown in block 301. Use cases can include basic access control, access control plus electronic biometric detection (EBD) such as a thermal check for elevated body temperature, access control plus time clocking, access control plus mask detection, or access control plus density estimation. When the system is on, it is actively detecting activity or conditions (block 302), including detecting faces, detecting people, detecting personal devices, detecting gait, and detecting adverse conditions for facial recognition such as glare or bad lighting. Detections can occur using multiple modalities such as regular cameras, thermal detectors, lidar detectors, etc.

The system will detect user devices and users (block 303) as described in FIG. 2. When a device and user are detected, the processor moves to block 304 to determine whether conditions are met for allowing the user access to a controlled area. Conditions requiring verification include any combination of the following factors selected from recognition of an authorized user's face or other biometric, detection of a personal device associated with an authorized user, passing liveness and spoof tests, passing mask check, passing EBD check, passing density estimation, crowd count and spatial distribution check, and application of conditional access rules such as checking identity, time and location matches for rules applied to the authorized user.

If the system determines that an authorized user and a device associated with the user are detected and any additional required conditions are met, the system moves to block 305 to grant access to the user. Granting access includes the processor sending instructions to the barrier at the access control point to open and allow the user to enter in block 306. As described herein, opening the barrier may include opening a physical barrier such as unlocking a door, opening a turnstile, etc. but may also include allowing access virtually such as allowing user access to a secured electronic system. Granting access may also include logging data about user access to a database for tracking access, location of the user, clocking in a user for time records, updating user appearance for machine learning, etc. in block 307.

If the face and/or device is not recognized in block 304, the system will deny entry for the unrecognized user in block 308. If conditions are not met in block 304, the system will deny access even to an authorized user in block 308. In some embodiments, the processor may move to block 309 to trigger a fallback routine. Fallback routines can involve the system sending an alert to a system administrator to authorize access to a user. In other embodiments, the system may initiate one or more fallback factors in block 310, where the system interacts autonomously with the user denied access. Fallback factors may include the system asking the user at the access control point to scan an authorized device such as a key or fob at a reader, and/or click a link sent over the phone to a mobile phone associated with an authorized user. In embodiments, the user's mobile phone may comprise the authorized device associated with the user. Other fallback factors include the system attempting to obtain a new image for facial recognition such as requesting a head pose challenge (e.g. the user changing his pose to present his face in front of the detector) or a face landmark challenge (e.g. the user moving his lips or blinking), or requesting that an article of clothing such as a scarf, mask or headgear be removed. Other fallback factors may include the controller modifying adverse conditions that prevented facial recognition, such as poor lighting, shadows, etc. Still other fallback factors may include voice authentication by asking the user to say a word or phrase, optionally for voice recognition authentication. In embodiments, the word or phrase may be indicated by the system for the user to repeat, or it may be a password or pass phrase known to an authorized user. In block 311, the processor may send feedback to the system documenting the access denial for the system to understand the reasons for denial as discussed further below.

In some embodiments, the unrecognized user may have the ability to initiate the fallback routine to allow using his mobile app actively, or badge or a physical key. For example if the camera on location fails to identify a user, the user can present a badge to the reader or open the app and perform a face recognition match in the mobile app using his camera phone. In other embodiments, the system may push a security verification code or a security question to the smart device for the user to respond to via the smart device. Optionally, this can be used in conjunction with GPS location coordinates obtained in the app to grant access.

If the system includes a clock code as a second code as described above, access may be denied if the clock code is expired. A fallback routine may include a user requesting a new clock code.

In some embodiments, the system may be configured to allow only a single user at a time to access the restricted area. If multiple faces are detected, the system may instruct the users to separate so that only a single user is processed in the biometric identification. In other embodiments, more than one user may be admitted, provided that all users are recognized as authorized users. If multiple faces comprising a combination of recognized and unrecognized faces (for example a combination of a host and guest(s)), the system may instruct an authorized user (or an administrator) to provide verification that the unrecognized user is authorized to enter the area. This may comprise using a fallback routine as described below.

In some embodiments, a fallback routine may comprise a user contacting a human administrator or host via the access control point or a mobile device to confirm the user's identity and authorization and approve access. In some embodiments, the system is deployed with an active learning interface, which allows users and administrators to train the system as they go. For example, if the system does not recognize an authorized user, the authorized user or administrator may update the system with a recent picture such as captured by the biometric capture device at the access control point or the credentialing app in a mobile smart device to improve recognition. The facial recognition system may use algorithms to check that the new picture or image has sufficient similarity to the authorized user's previous facial recognition template to be accepted as an updated image of the authorized user. Machine learning algorithms in the system may process the efficacy of the biometric recognition of authorized users to improve its ability to recognize users. The system then checks if the user's device was also detected (beacon broadcast response flow above) to decide whether to unlock the operable barrier when the face is recognized by the facial recognition determination by the processor (steps 207-211 of FIG. 2).

In step 207, the system looks up the identified face to check the timestamp of when the target's personal device or tag was last detected (from step 203). If the user is identified as an authorized user, the processor looks up the last detection of the device associated with the authorized user and determines whether the last detection is within a predetermined time interval between detection of the device and identification of the authorized user.

In some embodiments, the time between device detection and appearance of a user at the access control point can be defined to be a range of time expected for a user to travel, such as by driving, walking or combinations thereof, from the location of the device detector to the access control point. In some embodiments, both the device detection and the biometric capture may occur at the access control point and the time difference may be essentially zero. If the time difference is too small or too large, the system may determine that the credential device and the authorized user are not travelling together and deny access. If the interval is too large, the system may determine that the user deviated from the expected path and may deny access. Optionally, any deviation from the expected time difference may trigger sending an alert to an administrator for investigation and/or rectification, which may include the administrator authorizing entry once identity of an authorized user is confirmed. Deviations from an expected time interval may also be stored in a memory (database) for use in e.g. machine learning to improve time interval definition or audit functions of the system.

Optionally, in some embodiments, the system can measure the distance to the user's device or tag (step 209). Alternatively or additively, the system will check that the proximity of the device associated with the authorized user is within a specified distance from the access control point (step 210). Distance measurements can happen in multiple ways, using computer vision with 2D and 3D capture devices, such as lidar camera or time of flight measurements. More commonly, this may be done using the signal strength of a wireless transmitter (i.e. bluetooth beacon in the device), wherein the stronger the signal the closer the person is to the device. The reader can be calibrated at installation and can auto-update during operation. Signal strength can be adjusted to define a range of proximity limited to a distance set in the system such as within about 0.5 to about 1.5 meters, for example.

If the system determines that the authorized user and a device associated with the authorized user are both at the access control point, the system will instruct the closure device to unlock or actuate the operable barrier to allow the authorized user to enter the area. If the multiple factor condition occurs, in this case, the face is identified and the target's personal device is detected in the last x seconds and the distance is within the appropriate threshold, then the system unlocks the door for the user (steps 208, 210 and 211).

Optionally, if the user/guests/visitors are detected within certain distance of the access control point, the system will alert the host as to the arrival of visitor.

As shown in FIGS. 1 and 2, an exemplary embodiment comprises facial recognition as a basis for the user identification, but this is not limited.

In some embodiments, the system may comprise a single device detector or more than one device detector for layered security. For example but not limitation, the device detector may be located at an entrance to a parking area, an exterior door of a building, an inner lobby of a building, an elevator door or a stairwell door, or a door to a secure area within a building such as a laboratory, clean space, library, file room, computer server room and the like. In some embodiments with more than one device detector, access can be granted or denied based on detection of the device at low security points, but high security points require both device detection and facial recognition to allow access the area. In some embodiments an operable barrier may be present at the location of the device detector to provide traffic flow control such as by limiting entry to an access control point to one user at a time for biometric capture. The barrier at the device detector may also provide a gating function to direct users to separate stations for biometric capture or other service functions requiring interactions with human or automated service providers, or paths that the users are authorized to take through a facility. An operable barrier may also provide physical separation among a plurality of users to provide crowd control, social distancing or other reasons requiring physical separation of a plurality of users.

Also, more than one access control point having both device detection and biometric identification may be instantiated in the access control system. Further, multiple detectors may be able to track a user's movements through a facility to determine whether the user has deviated from the user's expected path on the way to the access control point. For example, access control points having both device detection and biometric capture may be located at a perimeter of a facility and at secure locations inside the facility, with one or more device detectors located at less secure locations in the facility.

In some embodiments, such as an access control point at an elevator door, the system may identify an authorized user and instruct the door of the elevator to open and further instruct the elevator to travel to a floor that the authorized user is allowed access but not to floors where the user is not allowed access.

Embodiments of the operable barrier at the access control point may be physical barriers such as doors, gates, turnstiles and the like, and the closure device may comprise for example an electric lock, control panel, electric strike maglock, wife-enabled lock and/or actuator that receives instruction from the processor to allow the operable barrier to be opened by or passed through by an authorized user and prevent unauthorized users from passing through the barrier.

In some embodiments, the barrier at the access control point may also be virtual or logical, such as allowing or denying access to a secured database or computer system via a user input device such as a keyboard, smart device, computer, etc. in wireless or hardwired communication with the secured database or computer system.

In some embodiments, remote access may be contemplated. For example, remote access to a secured database or computer system may be granted to an authorized user if a device associated with the user can communicate a security code and a biometric characteristic of the authorized user captured by the device to the system. The device may be a mobile phone, smart watch, tablet, laptop computer, etc.

In some embodiments, the barrier at the access control point may comprise a lock-out to prevent operation or movement of a piece of equipment or object of value by non-authorized users, including for example, energizing or de-energizing a control panel, power switch, or power source. In some embodiments, the lock-out may be part of a safety system in which a lock-out can be imposed on equipment that is out of order, under repair or to prevent an unsafe condition if the equipment is operated. Such lock-outs may be assigned by a system administrator to override standard access to authorized users.

In some embodiments, inanimate objects such as portable equipment or devices, or other items of value to a client may also be tagged with an assigned security code on, for example, an RFID chip or tag that may or may not be visible to a user. Movement of the tagged object can be restricted to specified authorized users, such that the tagged object can only be moved through a facility in conjunction with a device assigned to an authorized user. If a tagged object and a device associated with a non-authorized user appear together at an access control point, the barrier may prevent movement of the tagged object and/or the system may send an alert to a system administrator. In some instances a tagged object may not be allowed to be moved from or to certain locations, even when accompanied by an authorized user. These embodiments may be useful for inventory control, theft prevention, or restriction of valuable, proprietary, hazardous or contaminated materials to defined areas of a facility.

In summary, the system may comprise a plurality of device detectors and a plurality of access control points. Granular access rules for enrolled users can be set for different rooms, buildings, systems, equipment or objects to authorize access for the users. The level of security and the types and count of authentication factors used can vary access depending on need. The system is scalable and can be customized to meet the security needs of a client operating the system.

The device detector may comprise an edge reader, wifi reader or Bluetooth beacon that can detect the proximity of user devices and interact with the user's device. The device associated with the authorized user may comprise a badge, fob, dongle, RFID card, smart phone, smart watch, tablet, laptop computer or any other device capable of receiving, storing and transmitting authentication information to interact with the system. The device may also comprise a government-issued or federal identity card with a pin number and face biometric to enable 'smart access' to government facilities or highly secured environments.

Beacons are transmitters that broadcast signals at set intervals so that smart devices within its proximity are able to listen for these signals and react accordingly. Apps installed on a consumer's smartphone listen for iBeacons. When an app hears an iBeacon, it communicates the relevant data (including a UUID) to the reader, which then triggers an action (unlocking the door or checking off the first step of a multi factor process).

The system may comprise software running on a processor as well as an application running on the user's personal device. The system can use a commercially available reader or custom reader, communicating detected credentials via Weigand, or via a serial console, to the processor. A bridge MCU can also be used to relay the information to the processor wirelessly. In the event of the latter, the system will include the firmware present on the reader to detect the person's personal device.

The system can be designed so that the user can download an app to a smart device that can interact with a beacon or reader or the app can be pushed to the user's device during an authorization procedure to associate a device with an authorized user. In other embodiments, the system can be designed with a detector that can "sniff" or detect devices in the vicinity without devices explicitly advertising or interacting with a beacon or reader. The design can depend on the nature of the deployment and the desired security level.

Proximity of the device associated with the authorized user to the device detector can be set in the system and may range from a few centimeters, such as from 0 to 10 centimeters up to several meters such as within one meter. Proximity of the device to the detector of about one meter allows a user "touchless" access by allowing the device to be held in the user's hand, carried on the user on a lanyard, clipped to the user's clothing, carried in a pocket, or carried in a container such as a purse, bag, satchel, briefcase, backpack and the like, without the need to present the device within a short distance to the detector.

In some embodiments, the device detector may be a camera configured to capture an image displayed on the device, such as a barcode, QR-code and/or other graphical representation. The detector may be configured to recognize a specified color displayed on the device as further authentication that the image is an authorized image and not a copy.

The biometric capture device may comprise a digital camera including a lidar camera, stereocamera, depth camera, etc. to capture biometric characteristics for, for example but not limitation, facial feature recognition, iris recognition, hand recognition, fingerprint recognition. Facial recognition can comprise recognizing features such as facial contours, shapes and/or distances associated with the eyes, eyebrows, cheeks, nose, mouth, ears, etc. of a user. It may also comprise a temperature sensor or thermographic camera to capture body temperature data. The biometric capture device may comprise a microphone to capture the user's speech for voice recognition. A microphone may also capture a password, pass phrase, or spoken access code uniquely assigned to an authorized user. Combinations of biometric characteristics of an authorized user can be used to identify the user to provide enhanced security.

In some embodiments, the system may employ a CCTV camera at the entrance of a facility such as a building or perimeter gate to capture biometric characteristics of an individual for identifying the individual and preloading their credentials. In some embodiments, a visitor to a facility may arrive at a security checkpoint to sign in and confirm the user's identity and authorization, at which time the visitor may be issued a temporary (e.g. one-time-use) device and the visitor's biometric characteristics captured for entry into the system by an administrator as an authorized user.

In some embodiments, temporary devices may include a physical device such as a paper or plastic ticket that can display a graphic depiction of a security code assigned to an authorized user and a data string transformed by the facial feature mapping template and algorithm from the image of the authorized user is encoded, encrypted and stored on the device associated with the authorized user. Storage of the encoded decrypted data string may be in the form of a graphical representation. Graphical representations may include for example, bar codes, QR codes and the like that can be read by an optical scanner as the device detector. Temporary devices may also include keycards, etc. that can be detected and read by wireless communication. Temporary devices may also include mobile phones, smart watches etc. that can display a graphic depiction of a security code assigned to an authorized user and a data string transformed by the facial feature mapping template and algorithm from the image of the authorized user is encoded, encrypted and stored on the device associated with the authorized user, wherein the graphical depiction can be detected and read by an optical scanner.

A facility may include a research complex, laboratory, data center, warehouse, factory, or any location where access is desired to be limited to employees, guest, visitors or other persons of interest to the entity operating the facility. A facility may also include a place of business where public access is intended to be limited by, for example, charging of an admission fee, ticket, rental fee, etc. including theaters, arenas, stadia, convention centers, museums, hotels, motels, resorts, casinos, etc. A facility may also include a transit center such as an airport, train station, bus station, subway station, port, etc. where access is intended to be limited to passengers, transit workers or other support personnel. In these facilities, access to areas such as concourses, boarding areas, service areas, vehicles, etc. may require access limited to authorized users. Vehicles may include aircraft, trains, buses, trolleys, automobiles, ships, ferries, or other devices configured to transport people or goods.

In some embodiments, the biometric capture device may comprise a personal mobile phone or other smart device configured to capture an image and transmit it to the system.

The system comprises memory to store device detection times, authorization codes assigned to the device and/or user, biometric characteristics of authorized users, etc. One of ordinary skill can appreciate that memory may be located at one or more of the device detector, the access control point, a database in wired or wireless communication with the device detector and/or access control point, wherein the database may be local or remote such as in a server, central controller or cloud, or any combination thereof. One of ordinary skill can also appreciate that multiple device detectors and/or multiple access control points may be in communication with a local or remote database, server, network or cloud network.

Memory may also store authorized times of entry for authorized users. For example but not limitation, authorized times of entry may be varied according to the classification of an authorized user. A permanent employee may have authorized time of entry for 24 hour/7 day access, access during normal business hours or the like depending on their security classification. Regular visitors or contractors may have authorized time of entry limited to certain days and/or hours within normal business hours. Visitors may be assigned one-time access limited to a period of time associated with a predetermined visit schedule such as a calendar entry in the system. For example, a meeting or appointment entered in a calendaring function of a mobile phone or a computer can be linked to the system to provide an expected time of entry for a visitor. For example, a meeting invitation and acceptance can book a calendar entry for visitor(s), human host(s), meeting room, central calendaring system at the host facility, and the system. The system can check whether visitors are authorized users of the system and authorize time of entry credentials in the visitors' devices and tag biometric characteristics of the visitors for use at the time of entry. If the visitor is not in the system as an authorized user, the system can prompt the visitor, host or administrator to enter the necessary credentialing information into the system, such as for example adding an app to a smart device and providing a picture for biometric characterization.

Similarly memory may also store approved areas of entry for authorized users. For example but not limitation, areas of entry may be varied according to the classification of an authorized user. A permanent employee may have access for all secured areas in a facility, access to specified areas or the like depending on their security classification. Regular visitors or contractors may have approved access limited to certain areas in the facility where they need to have access and denial of access to areas where they are not needed. Visitors may be assigned access only to "public" areas such as meeting rooms, rest rooms, break rooms, corridors and the like.

In some embodiments, memory on the user-associated device may store one or more of the user's biometric characteristic information, authorized times of entry, approved areas of entry or any other information used by the system to control access to the authorized user associated with the device. These embodiments allow for decentralized storage of authorization data.

A system administrator can assign or modify authorized time of entry or area clearance for a group of users having similar classifications or can assign, modify or cancel authorized time of entry or area clearance for an individual user as needed, including deletion of ex-employees from the system.

The system comprises one or more processors or controllers to receive and process inputs from the device detector and the biometric capture device, execute the process and logic, determine whether the device and the user are authorized to access the restricted area, instruct the closure device to allow access and perform any other task described herein. The one or more processors may be located at one or more of the device detector, the access control point, and/or a module in wired or wireless communication with the device detector and/or access control point, wherein the module may be local or remote such as in a server, central controller or cloud, or any combination thereof.

The system also comprises a communications bus to provide communication among the detectors, capture devices, processors, controllers, servers, networks and/or cloud networks.

The system may also comprise one or more user interfaces, such as for example but not limitation a user interface at the access control point to provide communication between the user and the system. The user interface at the access control point may comprise for example, one or more of a video camera, microphone, keypad, touchpad, touchscreen, graphical user interface (GUI) to enable a user to communicate and/or provide input to the system and optionally communicate with a human administrator. The user interface may also comprise components for the system and/or a human administrator to communicate with the user and provide information, including for example but not limitation, a video display such as an LCD or LED screen, speaker, emitters for sound and/or light indicators to provide status information, and the like.

A user interface may also be used by an administrator to provide instructions to the system to, for example, enroll users, enter calendaring information for meetings, appointments or other events, update authorizations, request and receive reports, etc.

The system can use a thermal imaging camera as a modality as a complement to the biometric characterization capture. Use of a thermal imaging camera may achieve the following benefits:

Better spoof and liveness detection, guarding against presentation attacks.

Better detection of individuals approaching the system and events, for example, even in pitch black conditions, the system can alter the environment by turning on lights after detecting a heat source having a temperature profile of a human.

Detection of elevated body temperature. The temperature check can operate in a relative fashion, highlighting individuals that score above the collective or their historic average. If the system detects an elevated body temperature, access may be denied even to authorized users. That is, detection of elevated body temperature prohibits access by the authorized user to the area. This can prevent contamination of a controlled access area by individuals suffering from infection by bacterial, microbial or viral disease vectors. Detection of elevated body temperature can be achieved by thermographic analysis of the surface of a user's body or portion thereof, such as the user's forehead or eye. Notably, detection of elevated body temperature is based on tracking and locking on a portion of the user's eye, such as an eye duct or cornea, for thermographic analysis.

The system can include detection of mask or other personal protective equipment (PPE), such as, for example but not limitation, respirators, SCBA, gloves, eye protection, ear protection, gowns, coveralls, hazmat suits, clean suits, booties, hardhats, etc., which can be used to tell the user to remove his mask for more reliable face recognition, and/or to ensure a user wears a mask or other PPE as a safety check before being granted access to a location. For example, a first access control point may be outside an anteroom for a clean area or an area where hazardous substances or conditions are present, wherein a user's face needs to be visible for identification of an authorized user. In the anteroom, PPE can be donned by the authorized user. A second access control point is at the entrance to the clean area or area where hazardous substances or conditions are present from the anteroom, where access is granted to the authorized user only when the required PPE such as a mask is detected to be worn by the authorized user. As described above, facial recognition at the entrance to the area may be limited to a portion of the facial feature mapping that would not be obscured by the mask. Hazardous substances or conditions may include toxic or asphyxiant gases, smoke or other airborne particulates, corrosive or toxic substances, excessive noise levels, elevated ambient temperatures, cryogenic temperatures, biohazards (microbes, bacteria, viruses, etc.), harmful light or radiation, for example but not limitation.

The system may be configured to detect body pose of individuals for gait recognition and/or activity recognition. For example, the detection of face landmarks can help the system estimate the gaze and head pose of an individual that will help ensure the system is actually detecting the right person and that the person is interacting with the system and actively looking at the biometric capture device or otherwise properly posed for biometric capture. The system may prompt the user to repose to enable biometric capture.

The access control point may further comprise scanning for unauthorized substances or devices, such as explosive substances or weapons, or proper deployment of PPE. Scanning can include sniffer devices to detect odors associated with unauthorized substances. Body pose recognition can be used to determine that the user is posed to facilitate body scanning to detect weapons or proper deployment of PPE. For example, the user may be directed to present front, side and back views of the user to the imaging camera.

One can appreciate that a closure device on an operable barrier designed to restrict entry to an area may also restrict exit from an area. Accordingly, an access control point may require two-way control of entry and exit. The system may comprise a comprehensive "badge-in, badge-out" throughout a facility that monitors authorized users' access of and location in the facility. For example, accounting of users' location in a facility may be desirable in emergency situations such as evacuation or shelter-in-place scenarios.

Generally, exit from an area may be enabled only by device detection and does not require facial recognition and authentication. However, in some instances, exit from an area may require both device detection and facial recognition. For example, as described above, an area may comprise an anteroom associated with a clean area or an area containing hazardous conditions. Entry to and exit from the clean area may require biometric confirmation that PPE is worn. Exit out of the anteroom into a public area may require confirmation that PPE is removed before exit. Confirmation of PPE removal may be achieved by facial recognition, camera-enabled surveillance, absence of security-tagged PPE, or combinations thereof. Exit may further require confirmation that tagged PPE is placed in proper locations for disposal, or decontamination and/or storage for future use. Facial confirmation of a user's exit may be required to disable a user interface to a secured computer system. Also as described above, attempted removal of a security tagged object from an area may be denied by the system.

The system can be tied to automated density estimation artificial intelligence (AI) algorithms, and can automatically grant or deny access based on capacity, social distancing rules, and spatial distribution of individuals.

In an exemplary embodiment of an automated density estimation artificial intelligence (AI) algorithm, visual density data is labeled by annotating the positions of objects in images obtained for an area. For example, objects in an area may comprises automobiles in a parking lot, people or portions thereof, e.g. faces, in a room, passageway, concourse, etc., livestock in a pen, corral or holding area, etc. The annotated data is converted into a density map with a mathematical operation, wherein the resulting density map maintains the spatial distribution of objects and works to a solution where a simple pixel summation totals the crowd count in the image. The density map can be further defined according to the type of objects. In exemplary embodiments, a number of cars in a parking lot can be transformed by an occupancy factor to estimate the number of people (crowd count) in a facility based on the number of cars in a parking lot. For example, the occupancy factor for vehicles parked in an employee parking lot may be lower than that of vehicles parked in a parking lot for an entertainment or sports venue.

A neural network with innovative data augmentation is then trained with that data (the density maps generated from the annotations). The neural network learns to count the objects in the image (people, cars, livestock . . . ) and produce a density map of a current situation. Access to an area may be determined by the density map. For example, if the density map shows a parking lot at its capacity, the system may direct additional vehicles to a different parking lot. In other examples, people or animals may be denied access to an area if a density map of the area exceeds a threshold value for total occupancy (crowd count) or spatial density (social distancing).

The system can sleep most functions while maintaining one or multiple forms of detections to conserve energy.

The system can provide feedback on why it failed to identify a biometric characteristic of an authorized user, including detecting glare, bad lighting, dark environments, obscured feature, etc. The system can proactively notify an administrator of the system if such a condition occurs in real-time. Machine learning algorithms can also train the system to adjust for such conditions to improve the efficacy of feature recognition. A human in the loop flow can include the user or administrator being presented with a log of identifications of an individual user. The user or administrator can then mark each identification as correct or false. This allows the system to determine running accuracy with human quality control. The human feedback can be used by the machine learning algorithm to adjust weighting factors to improve efficacy of identification.

Machine learning algorithms may also adjust weighting factors in the facial recognition system to account for "drift" of facial features by factors such as aging, change in hair style, including facial hair, etc. If the machine learning algorithm determines that confidence of facial recognition falls below a threshold value, the system may prompt the user to provide an updated biometric template.

The system can include an initial calibration step by the client that helps the system measure the signal strength at each entry point (device detection) and walks the client through optimal barrier or camera placement by automatically detecting glare, face size, bad lighting and other factors that can impact performance of the biometric capture device.

The system can produce reports and statistics for decision-makers of the client operating the system, such as owners, officers, managers, security personnel, administrators, and the like. Reports and statistics may include, for example, time and attendance patterns, feature recognition efficacy, access attempts by unauthorized users, etc.

Embodiments of the disclosed subject matter include the following, alone or in any combination.

A system for controlling access of a user to an area, the system comprising an operable barrier to entry to the area; a closure device configured to operate the barrier to prevent or allow entry of the user to the area; and a detector configured to wirelessly detect a device associated with an authorized user; a biometric capture device configured to capture a biometric characteristic of the user; a memory; a processor configured to receive data associated with the detection of a device associated with the authorized user from the detector and the biometric characteristic of the user from the biometric capture device; determine the proximity of the device associated with the authorized user to the detector and the time of detection of the device associated with the authorized user; compare the captured biometric characteristic to a characteristic of the authorized user stored in the memory; determine that the captured biometric characteristic matches that of the authorized user; determine that the proximity of the device associated with the authorized user to the detector and the biometric characteristic of the authorized user indicate the presence of the authorized user at the operable barrier; and instruct the closure device to operate the barrier to allow the authorized user to access the area.

The system wherein the biometric characteristic of the user comprises facial features of the user.

The system wherein the biometric characteristic of the user comprises a data string transformed by a facial feature mapping template and algorithm from an image of the user.

The system wherein the data string transformed by the facial feature mapping template and algorithm from the image of the authorized user is encoded, encrypted and stored on a database.

The system wherein the data string transformed by the facial feature mapping template and algorithm from the image of the authorized user is encoded, encrypted and stored on the device associated with the authorized user.

The system wherein the data associated with the detection of a device associated with the authorized user comprises the encoded, encrypted data string.

The system wherein the data associated with the detection of a device associated with the authorized user comprises a security code assigned to the authorized user.

The system wherein the processor is further configured to determine that the presence of the authorized user at the operable barrier is at a time at which the authorized user is permitted to access the area.

The system wherein access by the authorized user to the area is further determined based on measurement of crowd count of a plurality of users or estimation of spatial distribution of a plurality of users.

The system wherein access by the authorized user to the area is further determined based on detection of elevated body temperature of the user or detection of personal protection equipment.

The system wherein detection of elevated body temperature prohibits access by the authorized user to the area.

The system wherein detection of elevated body temperature is based on tracking and locking on a portion of the user's eye for thermographic analysis.

The system wherein detection of personal protection equipment is required for the authorized user to access the area.

The system further comprising machine learning algorithms to improve efficacy of the determination that the captured biometric characteristic matches that of the authorized user.

The system wherein the processor is further configured to determine that adverse conditions prevent accurate capture of the biometric characteristic of the user and provide output to instruct the access control point to notify the user that the biometric characteristic was not captured.

The system wherein the adverse conditions comprise detection of personal protection equipment and the output to instruct the access control point comprises notification to the user to remove the personal protection equipment.

A method for controlling access of a user to an area, the method comprising detecting a device associated with an authorized user; capturing a biometric characteristic of the user; determining the proximity of the device associated with the authorized user to the detector and the time of detection of the device associated with the authorized user; comparing the captured biometric characteristic to a characteristic of the authorized user stored in the memory; determining that the captured biometric characteristic matches that of the authorized user; determining that the proximity of the device associated with the authorized user to the detector and the biometric characteristic of the authorized user indicate the presence of the authorized user at the operable barrier; and instructing a closure device to operate a barrier to allow the authorized user to access the area.

The method wherein the biometric characteristic of the user comprises facial features of the user.

The method wherein the biometric characteristic of the user comprises a data string transformed by a facial feature mapping template and algorithm from an image of the user.

The method wherein the data associated with the detection of a device associated with the authorized user comprises a security code assigned to the authorized user.

The method further comprising the processor determining that the presence of the authorized user at the operable barrier is at a time at which the authorized user is permitted to access the area.

A non-transitory computer readable medium having computer readable instructions stored thereon, that when executed by a computer cause at least one processor to receive data associated with the detection of a device associated with the authorized user from the detector and the biometric characteristic of the user from the biometric capture device; determine the proximity of the device associated with the authorized user to the detector and the time of detection of the device associated with the authorized user; compare the captured biometric characteristic to a characteristic of the authorized user stored in the memory; determine that the captured biometric characteristic matches that of the authorized user; determine that the proximity of the device associated with the authorized user to the detector and the biometric characteristic of the authorized user indicate the presence of the authorized user at the operable barrier; and instruct the closure device to operate the barrier to allow the authorized user to access the area.

The non-transitory computer readable medium wherein the biometric characteristic of the user comprises facial features of the user.

The non-transitory computer readable medium wherein the biometric characteristic of the user comprises a data string transformed by a facial feature mapping template and algorithm from an image of the user.

The non-transitory computer readable medium wherein the data associated with the detection of a device associated with the authorized user comprises a security code assigned to the authorized user.

The non-transitory computer readable medium further comprising instructions to cause the processor to determine that the presence of the authorized user at the operable barrier is at a time at which the authorized user is permitted to access the area.

A system for controlling access of a user to an area, the system comprising an operable barrier to entry to the area; a closure device configured to operate the barrier to prevent or allow entry of the user to the area; a detector configured to wirelessly detect a device associated with an authorized user; a biometric capture device configured to capture a biometric characteristic of the user wherein the biometric characteristic of the user comprises a data string transformed by a facial feature mapping template and algorithm from an image of the user; a memory; a processor configured to receive data associated with the detection of a device associated with the authorized user from the detector and the biometric characteristic of the user from the biometric capture device; determine the proximity of the device associated with the authorized user to the detector and the time of detection of the device associated with the authorized user; compare the captured biometric characteristic to a data string transformed by a facial feature mapping template and algorithm from an image of the authorized user stored in the memory; determine that the captured biometric characteristic matches that of the authorized user; determine that the proximity of the device associated with the authorized user to the detector and the biometric characteristic of the authorized user indicate the presence of the authorized user at the operable barrier; and instruct the closure device to operate the barrier to allow the authorized user to access the area.

The system wherein the data associated with the detection of a device associated with the authorized user comprises a security code assigned to the authorized user.

The system wherein the processor is further configured to determine that the presence of the authorized user at the operable barrier is at a time at which the authorized user is permitted to access the area.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" or the abbreviation "e.g." is used to provide exemplary instances of the item in discussion, not an exhaustive or limiting list thereof, and should be interpreted as "example, but without limitation;" the term "illustration" is used to provide illustrative instances of the item in discussion, not an exhaustive or limiting list thereof, and should be interpreted as "illustration, but without limitation." Adjectives such as "known," "normal," "standard,"

and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%.

The invention claimed is:

1. A system for controlling access of a user to an area, the system comprising
    an operable barrier to entry to the area;
    a closure device configured to operate the barrier to prevent or allow entry of the user to the area;
    a detector configured to wirelessly detect a device associated with an authorized user;
    a biometric capture device configured to capture a biometric characteristic of the user;
    a memory; and
    a processor configured to
    receive data associated with the detection of a device associated with the authorized user from the detector and the biometric characteristic of the user from the biometric capture device;
    determine the proximity of the device associated with the authorized user to the detector and the time of detection of the device associated with the authorized user;
    compare the captured biometric characteristic to a stored characteristic of the authorized user stored in the memory; wherein the stored characteristic of the authorized user comprises an encoded and encrypted data string transformed by a facial feature mapping template and algorithm from an image of the authorized user;
    determine that the captured biometric characteristic matches that of the authorized user;
    determine that the proximity of the device associated with the authorized user to the detector and the biometric characteristic of the authorized user indicate the presence of the authorized user at the operable barrier; and
    instruct the closure device to operate the barrier to allow the authorized user to access the area.

2. The system of claim 1 wherein the biometric characteristic of the user comprises facial features of the user.

3. The system of claim 1 wherein the captured biometric characteristic of the user comprises an encoded and encrypted data string transformed by a facial feature mapping template and algorithm from an image of the user.

4. The system of claim 3 wherein the captured biometric characteristic is compared to the stored characteristic of the authorized user stored in the memory.

5. The system of claim 3 wherein the data string transformed by the facial feature mapping template and algorithm from the image of the authorized user is encoded, encrypted and stored in memory on the device associated with the authorized user.

6. The system of claim 5 wherein the data associated with the detection of a device associated with the authorized user comprises the encoded, encrypted data string.

7. The system of claim 1 wherein the data associated with the detection of a device associated with the authorized user comprises a security code assigned to the authorized user.

8. The system of claim 1 wherein the processor is further configured to determine that the presence of the authorized user at the operable barrier is at a time at which the authorized user is permitted to access the area.

9. The system of claim 1 further comprising machine learning algorithms to improve efficacy of the determination that the captured biometric characteristic matches that of the authorized user.

10. The system of claim 1 wherein the processor is further configured to determine that adverse conditions prevent accurate capture of the biometric characteristic of the user and provide output to instruct the access control point to notify the user that the biometric characteristic was not captured.

11. A method for controlling access of a user to an area, the method comprising
    detecting a device associated with an authorized user;
    capturing a biometric characteristic of the user;
    determining the proximity of the device associated with the authorized user to the detector and the time of detection of the device associated with the authorized user;
    comparing the captured biometric characteristic to a characteristic of the authorized user stored in the memory, wherein the stored characteristic of the authorized user comprises an encoded and encrypted data string transformed by a facial feature mapping template and algorithm from an image of the authorized user;
    determining that the captured biometric characteristic matches that of the authorized user;
    determining that the proximity of the device associated with the authorized user to the detector and the biometric characteristic of the authorized user indicate the presence of the authorized user at the operable barrier; and
    instructing a closure device to operate a barrier to allow the authorized user to access the area.

12. The method of claim 11 wherein the biometric characteristic of the user comprises facial features of the user.

13. The method of claim 11 wherein the captured biometric characteristic of the user comprises an encoded and encrypted data string transformed by a facial feature mapping template and algorithm from an image of the user; and wherein the captured biometric characteristic is compared to the stored characteristic of the authorized user.

14. The method of claim 11 wherein the data associated with the detection of a device associated with the authorized user comprises a security code assigned to the authorized user.

15. The method of claim 11 further comprising the processor determining that the presence of the authorized user at the operable barrier is at a time at which the authorized user is permitted to access the area.

16. A non-transitory computer readable medium having computer readable instructions stored thereon, that when executed by a computer cause at least one processor to receive data associated with the detection of a device associated with the authorized user from the detector and the biometric characteristic of the user from the biometric capture device;

determine the proximity of the device associated with the authorized user to the detector and the time of detection of the device associated with the authorized user;

compare the captured biometric characteristic to a stored characteristic of the authorized user stored in the memory; wherein the stored characteristic of the authorized user comprises an encoded and encrypted data string transformed by a facial feature mapping template and algorithm from an image of the authorized user;

determine that the captured biometric characteristic matches that of the authorized user;

determine that the proximity of the device associated with the authorized user to the detector and the biometric characteristic of the authorized user indicate the presence of the authorized user at the operable barrier; and instruct the closure device to operate the barrier to allow the authorized user to access the area.

17. The non-transitory computer readable medium of claim 16 wherein the biometric characteristic of the user comprises facial features of the user.

18. The non-transitory computer readable medium of claim 16 wherein the captured biometric characteristic of the user comprises an encoded and encrypted data string transformed by a facial feature mapping template and algorithm from an image of the user; and wherein the instructions cause the processor to compare the captured biometric characteristic to the stored characteristic of the authorized user.

19. The non-transitory computer readable medium of claim 16 wherein the data associated with the detection of a device associated with the authorized user comprises a security code assigned to the authorized user.

20. The non-transitory computer readable medium of claim 16 further comprising instructions to cause the processor to determine that the presence of the authorized user at the operable barrier is at a time at which the authorized user is permitted to access the area.

* * * * *